US007532915B2

(12) United States Patent
Bennetts et al.

(10) Patent No.: US 7,532,915 B2
(45) Date of Patent: May 12, 2009

(54) ELECTRONIC APPARATUS HAVING THREE MODES OF OPERATION

(75) Inventors: David James Bennetts, Battle (GB); Richard Verney, Woking (GB)

(73) Assignee: Agere Systems Inc., Allentown, PA (US)

( * ) Notice: Subject to any disclaimer, the term of this patent is extended or adjusted under 35 U.S.C. 154(b) by 348 days.

(21) Appl. No.: 10/700,189

(22) Filed: Nov. 3, 2003

(65) Prior Publication Data

US 2005/0096106 A1 May 5, 2005

(51) Int. Cl.
*H04M 1/00* (2006.01)
(52) U.S. Cl. .............. 455/575.3; 455/575.1; 455/575.2; 455/575.4
(58) Field of Classification Search ... 455/575.1–575.4, 455/424, 425, 347, 90.3, 66.1, 566, 550, 455/575; 248/309.1–316; 312/7.1; 345/169
See application file for complete search history.

(56) References Cited

U.S. PATENT DOCUMENTS

| 5,661,641 | A | | 8/1997 | Shindo | |
|---|---|---|---|---|---|
| 6,009,336 | A | * | 12/1999 | Harris et al. | 455/566 |
| 6,377,444 | B1 | * | 4/2002 | Price et al. | 361/683 |
| 6,549,789 | B1 | * | 4/2003 | Kfoury | 455/550.1 |
| 7,126,588 | B2 | * | 10/2006 | Oakley | 345/169 |
| 7,197,332 | B2 | * | 3/2007 | Andersson et al. | 455/557 |
| 2003/0040899 | A1 | * | 2/2003 | Ogilvie | 704/2 |
| 2004/0204123 | A1 | * | 10/2004 | Cowsky et al. | 455/565 |

FOREIGN PATENT DOCUMENTS

| EP | 944219 | 9/1999 |
|---|---|---|
| GB | 2289595 | 11/1995 |
| GB | 2358758 | 8/2001 |
| JP | 2002-171324 | 6/2002 |
| JP | 2002-198849 | 7/2002 |
| JP | 2002-232528 | 8/2002 |

(Continued)

OTHER PUBLICATIONS

JPO Examiner's Office Letter, dated Feb. 1, 2008 for Patent Application No. 2003-374243.

*Primary Examiner*—Vincent P Harper
*Assistant Examiner*—Fred A Casca

(57) ABSTRACT

The present invention provides a portable electronic communication apparatus comprising two folder parts and/or a user-interface having two active modes of operation. The apparatus includes first and second members, with each having a first surface and an opposite second surface, with the user interface being provided at the first surface of the first member and connecting means for movably connecting the first and second members such that, in a first active mode of operation of the user-interface, the first and second members are positioned apart in an open position, and, in a second active mode of operation of the user-interface, the first and second members are positioned together in a first closed position such that the second surface of the first member is closed toward one surface of the other member.

The invention provides for a handset in which the user display is provided on the outside when the handset is folded, thus allowing for the utilization of a single display with the handset in either the folded configuration or unfolded configuration, thus greatly enhancing reliability and cost-effectiveness as it greatly diminishes the need for material and technical development resources and the number of components.

20 Claims, 4 Drawing Sheets

FOREIGN PATENT DOCUMENTS

| | | |
|---|---|---|
| JP | 2002-314657 | 10/2002 |
| JP | 2002314657 A | 10/2002 |
| WO | 98/16047 | 4/1998 |
| WO | 98/38822 | 9/1998 |
| WO | 01/53919 | 7/2001 |

* cited by examiner

ELECTRONIC APPARATUS HAVING THREE MODES OF OPERATION

FIELD OF THE INVENTION

The present invention relates to portable electronic apparatus, particularly communication apparatus comprising two foldable parts. The invention is particularly but not exclusively concerned with portable communication devices such as mobile telephones and personal data assistants.

BACKGROUND OF THE INVENTION

Mobile telephone handsets utilising folding covers are well-known. In such devices, when the telephone is on standby or switched off, a folding cover is closed back over the main body of the phone. In use, such as when making a call, the cover is opened.

Some of such handsets are simply provided with a folding cover, which simply provides a microphone for the user to speak into. The folding cover is small in size relative to the main body of the handset.

Other such handsets are provided with two parts each of which include functional elements of the phone, and which are substantially similar in size. One part may house a keypad for the phone, and the other part may house a display for the phone. The two parts may be folded over when the phone is not in use or on standby. Typically the two parts of such a handset may completely cover the functional surfaces of the handset, that is the user display and the keypad, when closed. Such handsets may be described as 'clamshell' handsets.

A particular advantage of such handsets is that when the handset is closed, it is physically much smaller and therefore less bulky to carry.

A disadvantage with such an apparatus is that the large display is not useable when the phone is closed, the display being an expensive component of the phone. The user may wish to see the user display when the device is in its closed position, for example if the device is remaining on standby. However in order to enable the display to be visible, it would not be possible to fold the phone closed to such a small size.

A solution has been proposed for this problem by providing a handset with two displays. A normal display is provided for when the handset is open. A second display is provided for when the handset is closed, and the first display is not accessible. Due to structural constraints, the second display is usually smaller than the first. Typically, the two displays may be provided on opposite sides of the folding or closing part of the handset.

A disadvantage with such a solution is that the provision of a second display increases the material costs of the handset. In addition the provision of twin displays requires technical development resources. Furthermore, the use of a more complex design may lead to increased reliability problems.

It is an object of the present invention to provide an improved apparatus which addresses one or more of the above-stated problems.

SUMMARY OF THE INVENTION

In accordance with the present invention, there is provided a portable electronic communication apparatus including a user-interface having two active modes of operation, the apparatus including: first and second members each having a first surface and an opposite second surface, the user interface being provided at the first surface of the first member; and connecting means for movably connecting the first and second members such that, in a first active mode of operation of the user-interface, the first and second members are positioned apart in an open position, and, in a second active mode of operation of the user-interface, the first and second members are positioned together in a first closed position such that the second surface of the first member is closed toward one surface of the other member.

Preferably, in a third mode of operation of the user-interface, the first and second interfaces are positioned together in a second closed position such that the first surface of the first member is closed toward one surface of the other member such that the user interface is inaccessible. In the third mode of operation, the user-interface is preferably inactive.

The user-interface is preferably a display. The apparatus is preferably provided with a single display. As such, a single display is used with the apparatus in the open configuration and in the first closed configuration.

In a further aspect, the present invention provides a portable electronic communication apparatus including first and second members each having a first surface and an opposite second surface, a user interface being provided at the first surface of the first member; and connecting means for movably connecting the first and second members such that, in a first closed position, the first surface of the first member is closed toward a surface of the second member, and in a closed position the second surface of the first member is closed toward a surface of the second member.

In a still further aspect, the present invention provides a portable electronic communication apparatus including: first and second members each having a first surface and an opposite second surface, a first user interface being provided at the first surface of the first member and a second user interface being provided at the first surface of the first or second member; and connecting means for movably connecting the first and second members such that, in a first closed position, the second surfaces of the members are closed toward each other.

Thus, the invention provided for a handset in which the user display is provided on the outside when the handset is folded. A single display can thus be utilized with the handset in either the folded configuration or unfolded configuration. The cost of material and technical development resources can thus be eliminated as there are less components to fail, reliability is improved.

BRIEF DESCRIPTION OF THE DRAWINGS

The invention is described herein by way of reference to the examples shown in the accompanying drawings, in which.

DESCRIPTION OF THE PREFERRED EMBODIMENTS

The invention is described herein by way of reference to a particular non-limiting example. The invention is not, however, limited to such an example.

In particular the invention is described herein by way of reference to an example of a mobile telephone handset. The invention may be equally applied, however, to other devices, such as a personal data assistant (PDA).

Figure 1:
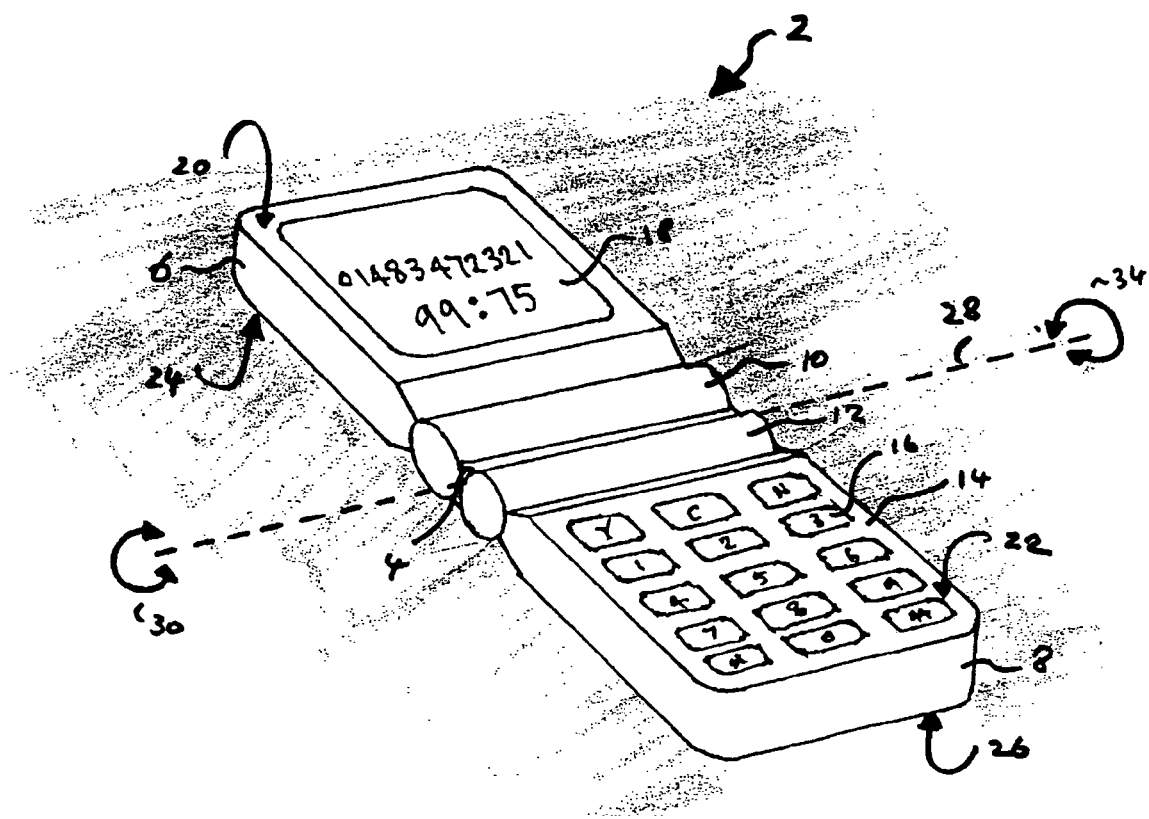
FIG. 1 is a perspective view of an exemplary communication device in accordance with the present invention in a normal mode of operation.

Referring to FIG. 1, there is illustrated an exemplary mobile telephone handset in which the present invention may be advantageously utilized, generally designated by reference numeral 2.

The exemplary handset is comprised of two members, generally designated by reference numerals 6 and 8. In the described embodiment, each member 6 and 8 comprises a housing for electronic circuitry.

The member 8 comprises a housing for the user input portions of the device, for example, the keypad generally designated by reference numeral 14. The keypad 14 includes a set of keys, such as key 16. The keypad 14 is used by the user to input information, as is well known in the art. The keypad 14 is provided at a first surface 22 of the member 8.

The member 6 comprises a housing for the user display, for example, the LCD (liquid crystal display) generally designated by reference numeral 18. The display 18 is used to display information to the user, as is well known in the art. The display is provided at a first surface 20 of the member 6.

Each of the housings 6 and 8 may contain electronics for the operation of the handset 2.

The member 6 is provided with a hinge element 10, and the member 8 is provided with a corresponding hinge element 12. The hinge elements 10 and 12 are joined by a connecting means 4, such that each of the members 6 and 8 is rotatable. The axis generally designated in FIG. 1 by reference numeral 28 represents, in general, a nominal axis about which the members 6 and 8 rotate. A specific implementation of the connection of the members 6 and 8 is described further herein below with reference to FIG. 4. In general, the members 6 and 8 are movably connected.

As shown in FIG. 1, each of the first surfaces 20 and 22 of the first and second members 6,8 is provided with a user interface. Each of the first and second members additionally has a respective second surface 24 and 26, the second surface of each member 6,8 being opposite the respective first surface. The first and second surfaces are generally rectangular, and are the dominant surfaces of the members 6, 8.

In FIG. 1, the handset is shown in the 'open' position, with the first and second members 6, 8 rotated about the general axis 28 in opposite directions such that they generally extend away from each other. Although in FIG. 1 it is shown that surfaces of the two members 6,8 appear to be generally in the same plane, forming an angle of 180°, in practice the members may be positioned to such that there is an angle of less than 180° there between.

The 'open' position of FIG. 1 corresponds to that known in the art for 'fold-over' handsets. In the position shown in FIG. 1, the handset is ready for use, with both the keypad and the display being accessible to the user. Preferably, each one of the members 6, 8 respectively houses the microphone and speaker for the handset, at distant ends from the connecting means 4. Thus, for example, the earpiece for the handset may be provided at the first surface of the member 6, at the end distant from the connecting means 4, and the microphone of the handset may be provided at the first surface of the member 8, at the end distant from the connecting means 4.

In FIG. 1, the two members 6 and 8 are shown to be of substantially similar size and shape. The invention, however, is not limited to such an arrangement. The invention applies to any arrangement where two members are arranged to 'fold' with respect to each other, regardless of the relative size or shape of the members.

FIG. 1 also shows that one member houses the keypad and the other the display. The invention is not limited to such an arrangement. The invention may equally apply, for example, to a scenario where the keypad 14 and the display 18 are both provided at the first surface 22 of the housing 6, and the housing 8 is simply a flip-cover.

However the invention is advantageously applicable to arrangements where the display 18 would ordinarily be covered in the 'closed' position, and FIG. 1 represents a typical construction of such an arrangement.

With the mobile phone apparatus arranged in the configuration of FIG. 1, the phone is usually in an active mode of operation, with the phone being available for making and receiving calls, for example. The display 18 is in an active mode of operation. The display displays information such as incoming call number, number dialed, network status etc.

Figure 2:
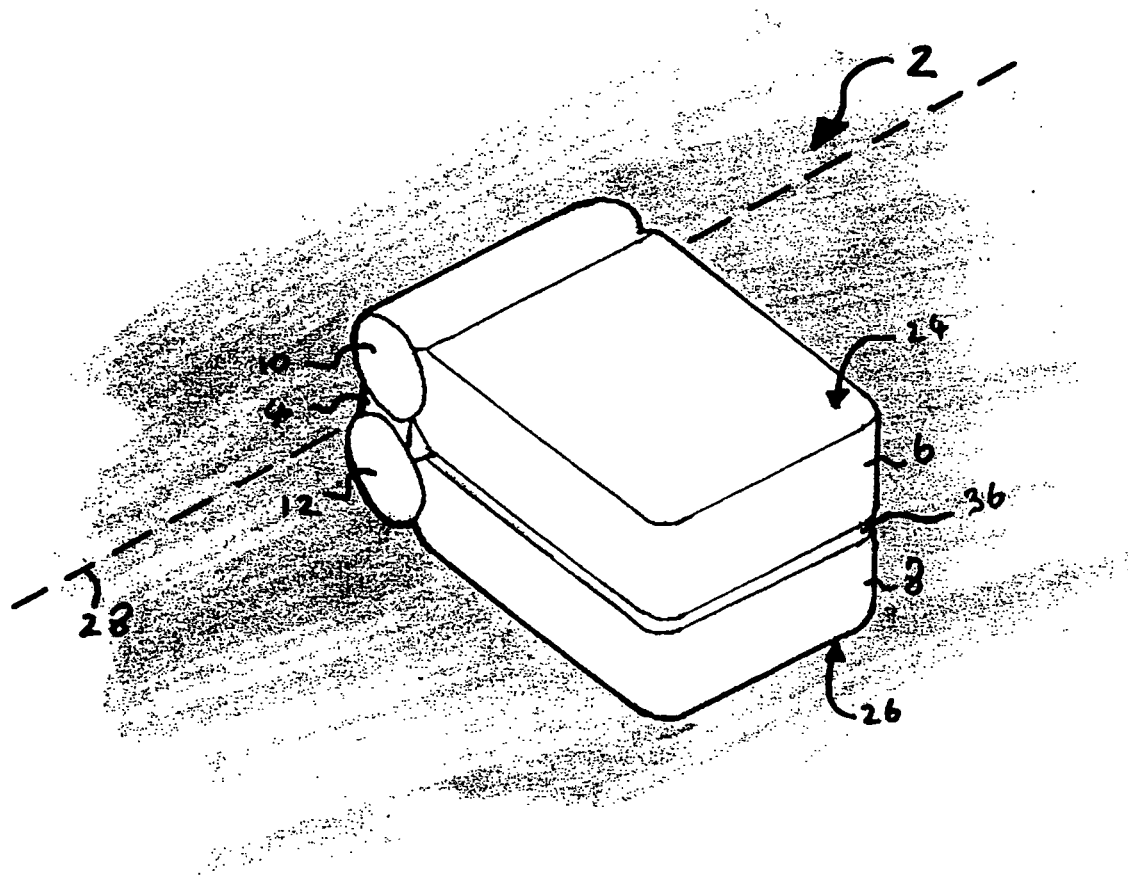
FIG. 2 is a perspective view of the exemplary communication device in accordance with the present invention in the switch-off mode of operation.

Referring to FIG. 2, there is illustrated the handset 2 of FIG. 1 in a first closed position. In the first closed position, the first and second members are closed toward each other such that the respective first surfaces close toward each other. Thus, referring to FIG. 1, the members 6, 8 are closed in the direction indicated in FIG. 1 by arrow 30.

As a result, the first surfaces 20 and 22 face each other. As shown in FIG. 2, there is a gap 36 that will depend upon the manufacturing precision of the handset, and particularly the connecting means 4 and cooperating hinge elements 10, 12. Ideally, there will be no gap. Each of the surfaces 20 and 22 may be provided with a lip around the surface thereof, which lips may engage when the first surfaces are brought together. The display 18 and keypad 14 may be recessed in the respective members 6,8, such that the surfaces close together when they are brought together.

In the closed position as shown in FIG. 2, neither the display nor the keypad of the handset is accessible. Whilst the phone may be adapted to be on standby in such a closed position, the user would not, for example, be able to see the display to identify an incoming call. In most handset designs, opening the handset would automatically answer the call.

The closed position of FIG. 2 may also represent the phone being switched off, and non-operational. Thus in the configuration of FIG. 2, the phone apparatus may be switched off and inactive. As the display 18 is not visible or accessible, then it is preferably in an inactive, or switched-off, state.

Thus, as shown in FIG. 2, the handset is designed to fold along the axis 28 to reduce its dimensions when not in active use. The axis 28 forms a center-line in the example shown. However it is not required that the fold be along a center-line.

The arrangement of FIG. 2 represents a conventional arrangement for 'folding-over' a mobile telephone handset, and such arrangements are known in the art.

Figure 3:
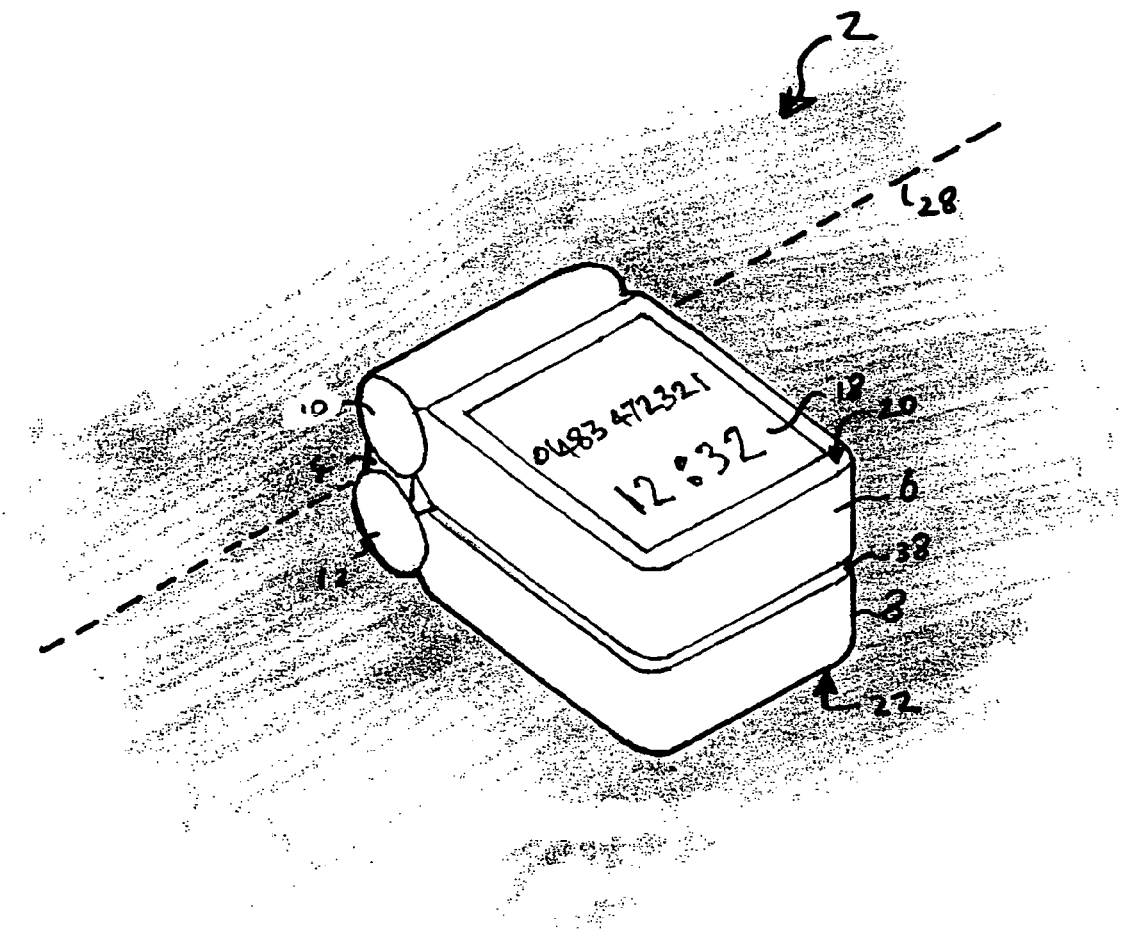
FIG. 3 is a perspective view of the exemplary communication device in accordance with the present invention in a standby mode of operation.

Referring to FIG. 3, there is illustrated the handset 2 of FIG. 1 in a second closed position, in accordance with a preferred embodiment of the present invention. In the second closed position, the first and second members are closed toward each other such that the respective second surfaces close toward each other. Thus, referring to FIG. 1, the members 6, 8 are closed in the direction indicated in FIG. 1 by arrow 34.

As a result, the second surfaces 24 and 26 face each other. As shown in FIG. 3, there is a gap 38 which depends upon the manufacturing precision of the handset. As discussed above with reference to gap 36, ideally, there will be no gap. Each of the surfaces 24 and 26 may be provided with a lip around the surface thereof, which lips may engage when the first surfaces are brought together. The surfaces may simply close together when they are brought together.

In the second closed position as shown in FIG. 3, the display 18 at the first surface 20 of the member 6 is accessible to the user. As such, the display 18 is available for use by the user. With the phone apparatus configured in the second closed position as shown in FIG. 3, the display 18 has a second mode of active operation. In this mode, the display may display information associated with a standby state of the phone. In addition, although not shown in FIG. 3, the keypad 14 at the first surface of the member 8 is accessible to the user.

The handset may be adapted to be on standby in such a closed position, and the user would, for example, be able to see the display to identify an incoming call.

The second closed position of FIG. 3 may also represent the phone being switched off, and non-operational.

Thus, as shown in FIG. 3, in accordance with the preferred embodiment of the present invention, the handset is further adapted to fold such that the display is on the outside when folded.

The provision of a handset adapted as illustrated in FIG. 3 has a number of advantages. The display size is maximised, since the display when the handset is in the second closed position is the same display as in the open position. The use of a single display reduces the number of components in the handset, and hence the volume and mass of the handset. The minimizing of materials provides for environmental savings. The provision of the second closed position also offers an elegant functional design, with the option to change the appearance of the phone in standby or switch-off mode between the first or second closed positions.

Thus, the present invention provides an apparatus having at least the two configurations generally illustrated in FIGS. 1 and 3, with a user interface, preferably a display, for use in a first, closed configuration of the apparatus and in a second, open configuration of the apparatus. As such, the user interface has two active modes of operation.

In the preferred embodiment of the present invention, the handset is further adapted to provide both the first and second closed positions. As such, the apparatus has a third, closed configuration in which the user interface is not provided for use. As such, the user interface has a further inactive mode of operation.

Thus, advantageously, when the access to the display is not needed, whether in standby mode, switched off mode or otherwise, the handset can be placed in the first closed position to protect the display from damage. Similarly, the keypad can be protected from exposure.

Thus the user can, for example, choose between a normal operating mode with the handset in the open position, a closed position offering access to the display, and a closed position providing protection of the display and any surface components.

However, the invention is not limited to the handset being adapted to provide the first and second closed positions. The invention may advantageously be utilized by just providing the closed position in which the user interface is accessible.

As discussed hereinabove, the apparatus adapted in accordance with the preferred embodiment of the present invention has several possible modes, depending on its configuration, i.e. whether it is open, closed with the display accessible, or closed with the display inaccessible. In each of the closed configurations of the handset, a range of possible operational modes may exist. However where the handset is in the closed position, with the display inaccessible, the user will not be able to see what the current mode of operation of the handset is.

In accordance with a further preferred embodiment of the present invention, a user may determine a preferred configuration for the handset for each closed configuration, which configuration is automatically selected when the handset is placed in the respective closed configuration.

As such, in this embodiment the handset can automatically detect whether it is open, closed in the first position (folded inwards) or closed in the second position (folded outwards). Responsive to detecting such state, the handset automatically enters a predetermined operating state. Whilst the operating states are preferably chosen by the user, they may be permanently set by the manufacturer, or set to an initial default by the manufacturer.

"An example of the various operating states is given hereafter. In the open position, the handset is fully available to make or answer a call. In the second closed position (folded outwards) the display is visible, and the phone is in standby awaiting incoming calls. The display may additionally be used in the normal way to identify incoming calls, and use passive features of the phone such as the clock. The keypad is preferably deactivated, to prevent accidental activation. In the first closed position, the handset is switched off, and the display and all surface components are protected."

Figure 4:
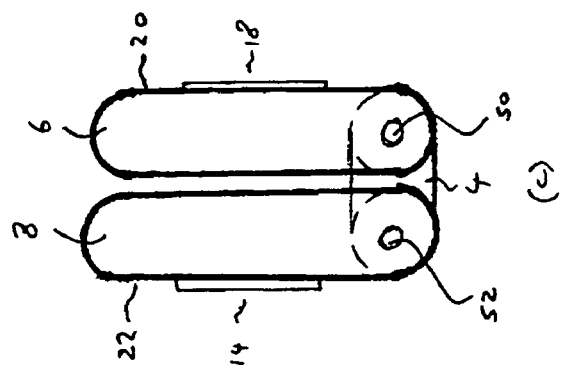
FIGS. 4A, 4B and 4C are side views of the exemplary communication device in accordance with the present invention's various open and closed positions of the present invention.
Figure 4:
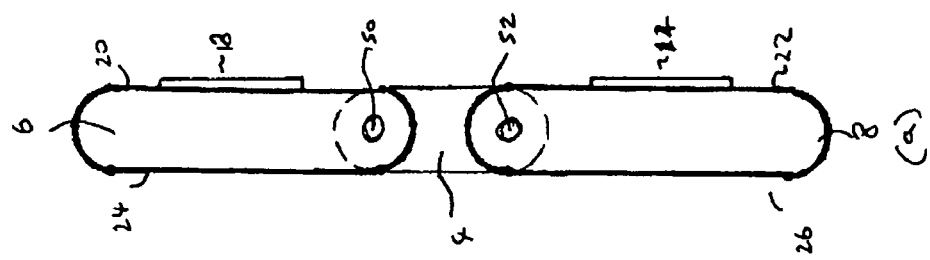
Figure 4:
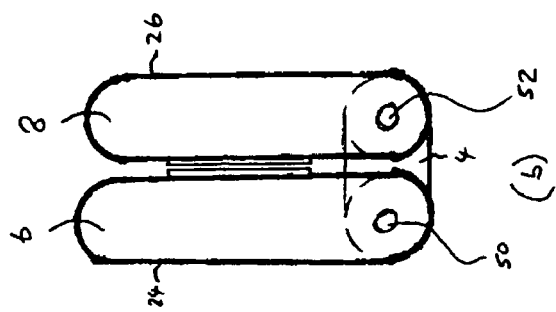

Referring to FIGS. 4A, 4B and 4C, an exemplary implementation of the connecting means for connecting the members 6, 8 is given. Referring to FIG. 4, each of the members 6, 8 is provided at one end thereof with a pivoting means 50, 52 respectively. The pivoting means 50, 52 are preferably pins. Each of the pins 50 and 52 is connected at distal ends thereof to the connecting means 4. In this embodiment, the connecting means 4 comprises two parts, each comprising a flat portion for connecting the ends of the pivoting means at the same sides of the members 6,8, and preferably further interconnected by rigid means (not shown in FIGS. 4A, 4B and 4C).

The specific implementation of the means for connecting the two members 6,8 is outside the scope of the present invention. The skilled person will appreciate various means for implementing such a connection. The arrangement of FIG. 4 is an exemplary arrangement merely for illustrative purposes.

It is envisioned that alternative means for interconnecting the members 6,8 may be provided. For example one or the other of the members 6,8 may be individually rotatable, such that, with the apparatus in the open position, one member is swivelled around such that either surface of that member may be closed against one surface of the other member.

FIG. 4(A) shows the apparatus in an open configuration, with the user interface, such as display 18, in a first active mode of operation. FIG. 4(C) shows the apparatus in a first closed configuration, with the user interface, such as display 18, in a second active mode of operation. FIG. 4(B) shows the apparatus in a second closed configuration, with the user interface, such as display 18, in an inactive mode of operation.

The invention has been described herein by way of reference to particular examples. One skilled in the art will appreciate that the invention need not be limited to such examples. Various modifications and adaptations to the described examples, without departing from the principles of the present invention, will be apparent to one skilled in the art. For example, the keypad can be placed on the opposite side of the bottom housing than is shown in FIGS. 4A, 4B, and 4C, such that, in a first closed position, the keypad is protected and the display is exposed and, in the second closed position, the display is protected and the keypad is exposed. An example of the various operating states is given hereafter. In the open position, the handset is fully available to make or answer a call. In the first closed position, the display is visible, but the keypad is not and the phone is in standby awaiting incoming calls. The display may additionally be used in the normal way to identify incoming calls, and use passive features of the phone such as the clock. The keypad is preferably deactivated, to prevent accidental activation. In the second closed position, the handset is switched off, and the display and keypad are deactivated.

The invention claimed is:

1. A portable electronic communication apparatus having at least three modes of operation and including a first user-interface comprising a display and a second user interface comprising a keypad, the apparatus including:

first and second housing members each having a first surface and an opposite second surface, the first user interface being provided at the first surface of the first housing member and the second user interface being provided at the first surface of the second member, and a connecting mechanism for movably connecting the first and second housing members, wherein a position of the first and second members relative to each other determines a mode of operation of the apparatus such that:

when the first and second housing members are connected and positioned together in a second closed position such that the second surface of the first housing member is closed toward one surface of the other housing member such that the first user interface and the second user interface are fully accessible, the apparatus is in a standby mode of operation in which the first user interface is active and the second user interface in inactive, when the first and second housing members are connected and positioned together in a first closed position such that the first surface of the first member is closed toward one surface of the other member such that the first user interface and the second user interface are inaccessible, the apparatus is in an inactive mode of operation in which both the first user interface and the second user interface are inactive, and when the first and second housing members are connected and positioned apart from each other in an open position, the apparatus comprises a fully operational active mode of operation in which both the first user interface and the second user interface are fully accessible and active.

2. A portable electronic communication apparatus according to claim 1 wherein the apparatus comprises one and only one display.

3. A portable electronic communication apparatus according to claim 1 wherein the apparatus is switched off in the first closed position.

4. A portable electronic communication apparatus according to claim 1 wherein the apparatus is a mobile telephone.

5. A portable electronic communication apparatus according to claim 1 wherein the apparatus is a personal digital assistant.

6. The portable electronic communication apparatus of claim 1, wherein an effective size of said first user interface is a same size whether in said fully operational active mode or said standby mode.

7. The portable electronic communication apparatus of claim 1, wherein in said standby mode of said second closed position, said first user interface may display information associated with said standby.

8. The portable electronic communication apparatus of claim 1, wherein said first user interface is a liquid crystal display (LCD).

9. The portable electronic communication apparatus of claim 1, wherein said fully operational active mode of operation is a first active mode of operation.

10. The portable electronic communication apparatus of claim 1, wherein said standby mode is a second active mode of operation.

11. The portable electronic communication apparatus of claim 1, wherein a user determines a configuration for said portable electronic communication apparatus for each closed configuration, which is automatically selected when the electronic communication apparatus is placed in a respective closed configuration.

12. A portable communication device comprising:

a first housing and a second housing, each housing comprising a first surface and a second, opposing surface, said first housing including a first user interface comprising a display disposed in the first surface thereof and said second housing comprising a second user interface in the first surface thereof;

a pivot mechanism that permits the first and second housings to be pivoted between:

an open position, wherein the device is in a fully operational active mode of operation, in which the first and second housings are connected to each other and are arranged generally end-to-end with each other, and wherein both the first user interface and the second user interface are fully accessible and active;

a second closed position, wherein the device is in a standby mode, in which the first and second housings are connected and the second surfaces of the first and second housings, respectively, face each other such that, in the second closed position, both the first user interface and the second user interface are fully accessible, wherein the first user interface is active and the second user interface is inactive; and a first closed position, wherein the device is in inactive mode, in which the first and second housings are connected and the first surfaces of the first and second housings, respectively, face each other such that, in the first closed position, both the first user interface and the second user interface are inaccessible and inactive;

means for automatically detecting when the device is in the first open position, the first closed position, or the second closed position; and means for automatically entering the corresponding mode responsive to the means for detecting.

13. A portable communication device according to claim 12 further comprising means for enabling a user of the device to select at least the standby mode and the inactive mode.

14. The portable communications device of claim 12, wherein an effective size of said first user interface is a same size whether in said fully operational active mode or said standby mode.

15. The portable communications device of claim 12, wherein said standby mode of said second closed position, said first user interface may display information associated with said standby state.

16. The portable communications device of claim 12, wherein said first user interface is a liquid crystal display (LCD).

17. The portable communication device of claim 12, wherein said fully operational active mode of operation is a first active mode of operation.

18. The portable communication device of claim 12, wherein said standby mode is a second active mode of operation.

19. A portable electronic communication apparatus having a single display and at least three modes of operation, said three modes including a first user-interface comprising said display and a second user interface comprising a keypad, the apparatus including:

first and second housing members each having a first surface and an opposite second surface, the first user interface being provided at the first surface of the first housing member and the second user interface being provided at the first surface of the second member, and a connecting mechanism for movably connecting the first and second housing members, wherein a position of the first and second members relative to each other determines a mode of operation of the apparatus as determined by the user such that:

when the first and second housing members are connected and positioned together in a second closed position such that the second surface of the first housing member is closed toward one surface of the other housing member such that the first user interface and the second user interface are fully accessible, the apparatus is in a first user-selected mode of operation;

when the first and second housing members are connected and positioned together in a first closed position such that the first surface of the first member is closed toward one surface of the other member such that the first user interface and the second user interface are inaccessible, the apparatus is in a second user-selected mode of operation; wherein said first and second user-selected modes are selected from the group consisting of:

a standby mode of operation in which the first user interface is active and the second user interface is inactive; and an inactive mode of operation in which both the first the first user interface and the second user interface are inactive; and when the first and second housing members are connected and positioned apart from each other in an open position, the apparatus comprises a fully operational active mode of operation in which both the first user interface and the second user interface are fully accessible and active.

20. The portable electronic communication apparatus of claim 19, wherein said first and second user-selected modes are different modes.

* * * * *